United States Patent

Radley

[11] Patent Number: 5,966,643
[45] Date of Patent: *Oct. 12, 1999

[54] HAND-HELD RADIOTELEPHONE HAVING TWO-PART CONSTRUCTION

[75] Inventor: Peter Ernest Radley, Paris, France

[73] Assignee: Alcatel N.V., Amsterdam, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/615,362

[22] Filed: Mar. 13, 1996

Related U.S. Application Data

[63] Continuation of application No. 08/239,613, May 9, 1994, abandoned.

[30] Foreign Application Priority Data

May 14, 1993 [EP] European Pat. Off. ............. 93107857

[51] Int. Cl.[6] .................................................. H04Q 7/32
[52] U.S. Cl. .................. 455/74.1; 455/412; 455/436; 455/550; 455/556; 379/56.1; 379/56.3
[58] Field of Search ................................. 379/56, 58, 61, 379/56.1, 56.3; 455/90, 74.1, 412, 436, 550, 556

[56] References Cited

U.S. PATENT DOCUMENTS

| | | | |
|---|---|---|---|
| 3,476,882 | 11/1969 | Vogelman et al. | 379/61 |
| 4,450,319 | 5/1984 | Lucey | 379/61 |
| 4,543,665 | 9/1985 | Sotelo et al. | 379/56 |
| 4,571,457 | 2/1986 | Hattori et al. | 379/56 |
| 4,591,661 | 5/1986 | Benedetto et al. | 379/61 |
| 4,629,828 | 12/1986 | Umebayashi | 379/56 |
| 4,659,878 | 4/1987 | Dinkins | 370/71 |
| 4,752,949 | 6/1988 | Steinbeck et al. | 379/63 |
| 4,905,270 | 2/1990 | Ono . | |
| 4,930,148 | 5/1990 | Lee | 379/58 |
| 5,197,091 | 3/1993 | Takagi et al. | 379/58 |

FOREIGN PATENT DOCUMENTS

| | | | |
|---|---|---|---|
| 0445808 | 9/1991 | European Pat. Off. | 455/90 |
| 0464011 | 1/1992 | European Pat. Off. . | |
| 2830096 | 11/1979 | Germany . | |
| 3401518 | 7/1985 | Germany . | |
| 3836406 | 5/1990 | Germany . | |
| 9200683 | 4/1992 | Germany . | |
| 0144130 | 7/1986 | Japan | 379/61 |
| 0120159 | 5/1989 | Japan | 379/61 |
| 4029966 | 12/1994 | WIPO | 379/58 |

OTHER PUBLICATIONS

DAK Industries Incorporated, "Headphone Phone", Popular Science Aug. 1983.

The Sharper Image, "First Cordless Phone that Fits in Your Ear", p. 9, Dec. 1987.

Hello Direct, "Wear This Phone and Headset for Complete Freedom to Walk and Talk", Winter 1991.

Patent Abstracts of Japan, vol. 7, No. 52 (E–162) (1197) 2, Mar. 1983 and JP–A–57 203 359 (Matsushita Denki Sangyo KK).

"Hochfrequente Strahlung und ihr Gefahrdungspotential", W. Mansfield, *Nachrichtentech, Elektronik*, No. 42, 1992, Berlin, vol. 6, pp. 224–227.

"Architektur eines Mobilfunkgerates fur das Netz D", P. Schoffel et al, *Philips Innovation*, Jan. 1991, pp. 132–136.

*Primary Examiner*—William Cumming
*Attorney, Agent, or Firm*—Ware, Fressola, Van Der Sluys & Adolphson LLP

[57] ABSTRACT

Known hand-held mobile radiotelephones and cordless telephones have the dimensions of a handset, and their antennas radiate near the user's head; such may be improved by providing a hand-held radiotelephone which is of a compact design and fully user-controllable and exposes the user to only little RF radiation. A hand-held radiotelephone (HH1) is provided whose earpiece (R) and/or microphone (M) are spatially separated from the other components of the radiotelephone. It is also possible to provide an infrared link between the earpiece and/or microphone and the housing of the radiotelephone in order to further increase the user's freedom of movement. During operation of the hand-held radiotelephone, the keyboard and display are fully accessible.

13 Claims, 3 Drawing Sheets

HH2

HAND-HELD RADIOTELEPHONE HAVING TWO-PART CONSTRUCTION

This application is a continuation of copending application Ser. No. 08/239,613 filed on May 9, 1994 now abandoned.

TECHNICAL FIELD

This invention relates to radiotelephones of the hand-held type.

BACKGROUND OF THE INVENTION

A hand-held radiotelephone is known from EP 04 64 011 A1. A hands-free module is connected to this hand-held radiotelephone by a connector. The hands-free module comprises an earpiece ("external phone unit") and an external microphone which are connected to the audio stage of the transceiver in addition to the internal loudspeaker and internal microphone, respectively. Accordingly, the hands-free module is designed as an add-on unit for the hand-held radiotelephone. The additional volume occupied by the hands-free module makes the telephone unwieldy, particularly during transport.

Another hand-held radiotelephone is disclosed in DE 34 01 518 C2. This radiotelephone can be folded into a more compact shape. In the unfolded condition, it is adapted to the shape of the human head. The antenna is incorporated in the housing of the hand-held radiotelephone, and during operation, it is in close proximity to the user's head. It extends from the area of the ear to the area of the mouth, so that the corresponding parts of the head are located directly in the radiation field of the antenna. The effects of the RF radiation on the health of the human organism are currently under intensive investigation and discussion (see article by W. Mansfeld, "Hochfrequente Strahlung und ihr Gef ährdungspotential" in "Nachrichtentechnik, Elektronik", No. 42, 1992, Berlin). Although definite results are not yet known, preventive solutions to the problem of reducing such exposure are being sought.

DE 38 36 406 C2 discloses a handset-shaped radio control unit which is integrated with a telescopic housing and is thus very compact during transport. For operation, the housing is changed into a handset-shaped structure adapted to the shape of the user's head. The transmitting/receiving antenna is in close proximity to the upper part of the user's head.

Prior art hand-held radiotelephones, such as hand-held mobile phones, or cordless telephones are designed to assume at least the size of a conventional handset during operation, with the antenna being in close proximity to the user's head.

SUMMARY OF THE INVENTION

It is the object of the invention to provide a hand-held radiotelephone which is of a compact design and fully user-controllable and exposes the user to only little RF radiation.

According to the present invention, a hand-held radiotelephone comprises radio frequency transmitting/receiving means for radio communication with a telecommunication system, control means for establishing a communication link, and only one electroacoustic reproducing means and only one electroacoustic pickup means which are arranged in such a way that at least one of the electroacoustic means is spatially separated from the other means.

According to a second aspect of the present invention, a hand-held radiotelephone comprises radio frequency transmitting/receiving means for radio communication within a telecommunication system, electrooptical display and/or pickup means, and only one electroacoustic reproducing means and only one electroacoustic pickup means which are arranged in such a way that at least one of the electroacoustic means is spatially separated from the other means.

A hand-held radiotelephone is provided in which at least one of the electroacoustic components is spatially separated from the other components of the radiotelephone. Through this spatial separation, the shape of the hand-held radiotelephone is independent of the shape of the user's head; such may be improved by providing a hand-held the head, so that the radiotelephone need not assume the shape of a handset and can be of a very compact design. Furthermore, all control means as well as the electrooptical display and pickup means are fully accessible even during operation, so that the hand-held radiotelephone is fully user-controllable. The spatial separation of the hand-held radiotelephone permits unrestricted use, during which the RF-radiating components of the radiotelephone are not in close proximity to the user's body. This reduces the exposure to RF radiation, particularly in the area of the user's head.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
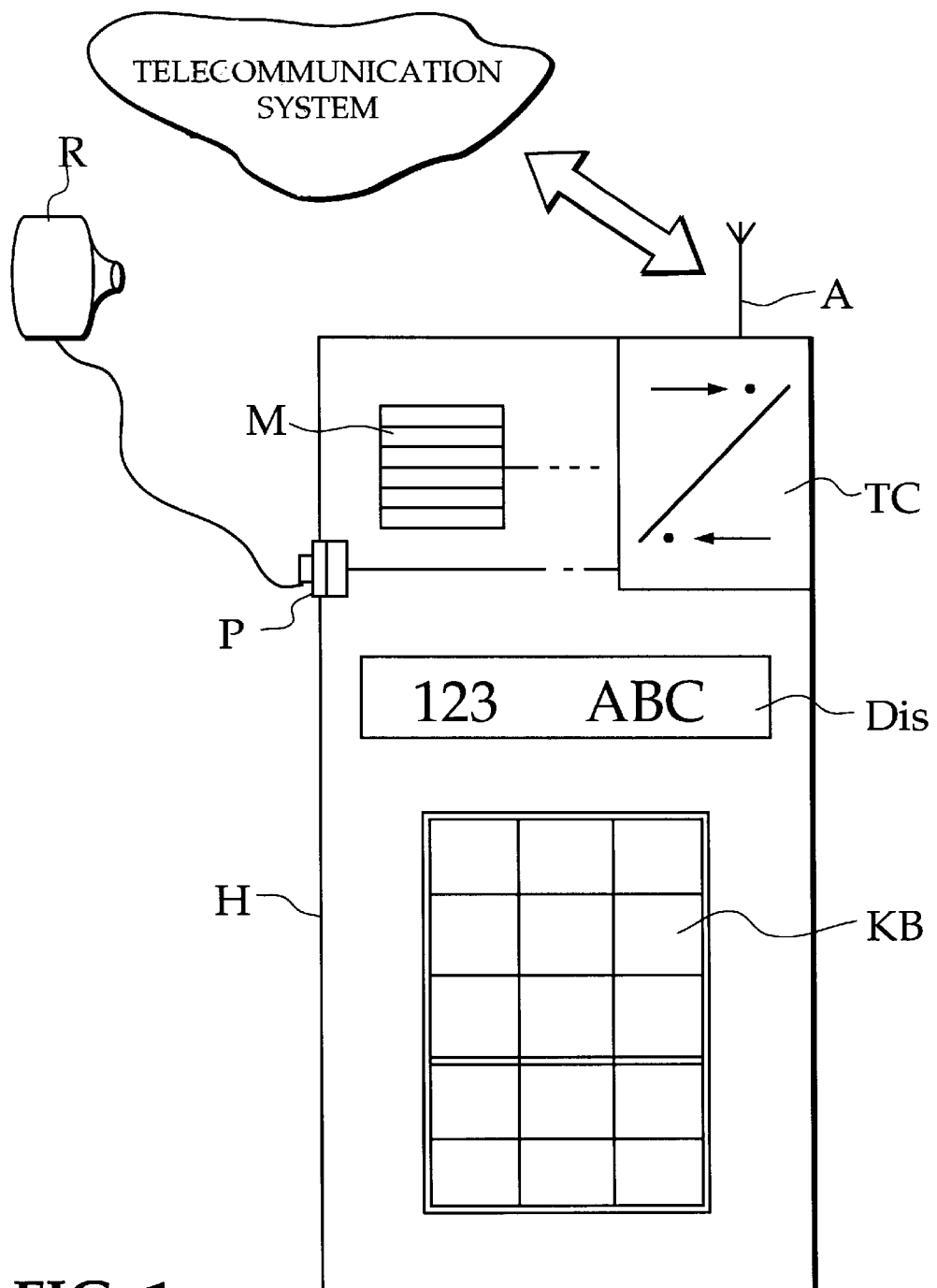
FIG. 1 is a schematic representation of a highly compact hand-held radiotelephone.

FIG. 1 shows a hand-held radiotelephone HH1 with a transceiver TC, an antenna A connected thereto, a keyboard KB, an alphanumeric display DIS, a microphone M, and an earpiece R (also known as an earphone).

While in this example the hand-held radiotelephone HH1 is a mobile phone, it is to be understood that the invention is not limited to mobile radiotelephones but also covers cordless telephones.

The detailed circuit and operation of a hand-held radiotelephone do not form part of the invention. The hardware and software architecture of a conventional hand-held radiotelephone is described, for example, in an article by P. Sch öffel et al, "Architektur eines Mobilfunkgerätes für das Netz D", Journal Philips Innovation 1/1991.

The earpiece R is spatially separated from the other components of the hand-held radiotelephone HH1, so that the radiotelephone is of two-part construction.

Thus, the housing 4 of the hand-held radiotelephone contains all components except the earpiece R. It is of a very compact design for the following reasons. On the one hand, it does not include a loudspeaker, and on the other hand, unlike in the case of conventional hand-held radiotelephones, no constraints are placed on the design of the housing by the mouth-to-ear distance in man.

The earpiece R is connected to the internal circuitry of the hand-held radiotelephone HH1 by means of an AF line and a separable connector P. The microphone M is incorporated in the housing of the radiotelephone and is preferably a directional microphone. Thus, good acoustic coupling of the user to the housing will be achieved even if the user is holding the radiotelephone far away from his body or sets it down on a supporting surface. The antenna will then be at a distance from the body which is equal to at least at one arm's length, i.e., approximately 60 cm. During operation of prior art hand-held radiotelephones, the antenna is located at a distance of about 2 cm from the head. Accordingly, the user of the novel hand-held radiotelephone is exposed to a field strength which is reduced in the ratio of about 1:30 (=2 cm:60 cm).

Furthermore, unrestricted access to the keyboard KB and reading of the display DIS are possible even while making a call. Thus, the user can read, for example, incoming text messages, such as so-called short messages.

It is also possible to retrieve stored data, such as subscriber numbers, addresses, appointments, etc., by keyboard inquiry.

To make the hand-held radiotelephone HH1 of FIG. 1 even more compact, integration of the antenna into the housing is conceivable.

Figure 3:
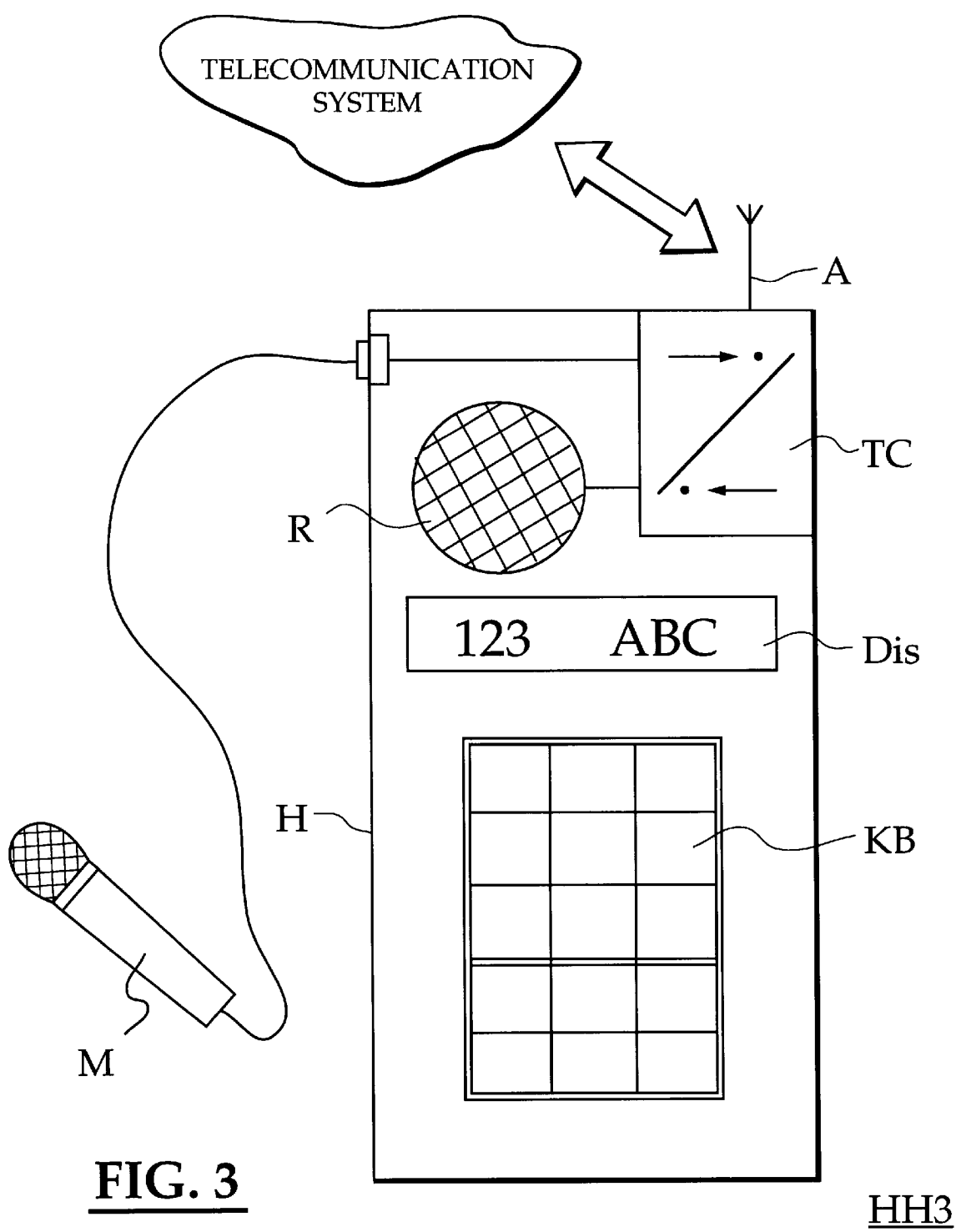
FIG. 3 shows another embodiment of the invention.

In addition to the earpiece R, as shown in FIG. 3 the microphone M could be separated from the radiotelephone housing, so that the latter could be of an even more compact design. The user would also be acoustically very closely coupled to the housing by means of a headset.

The hand-held radiotelephone HH1 shown in FIG. 1 is a very simple and low-cost embodiment of the invention.

An embodiment of a hand-held radiotelephone will now be described which is suitable for audio and video communication.

Figure 2:
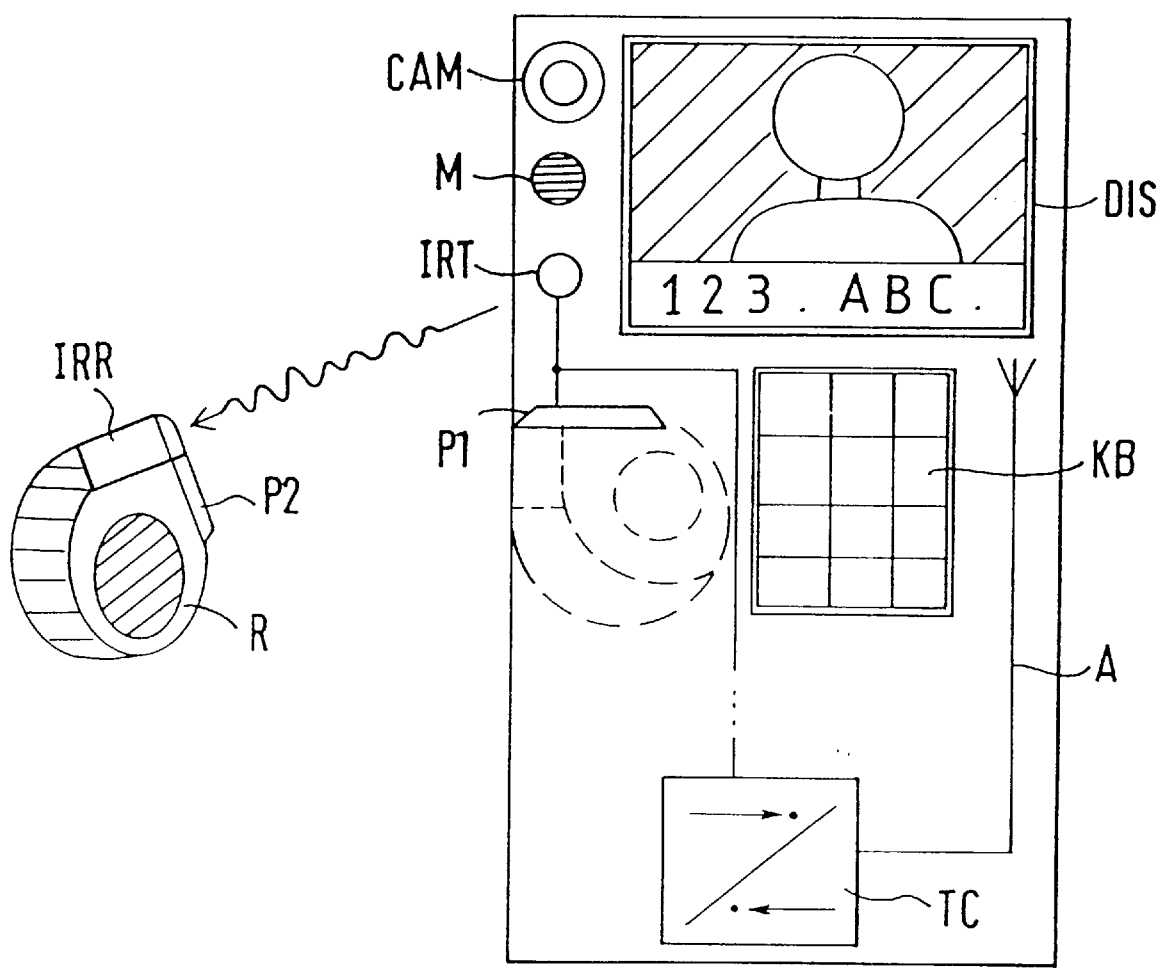
FIG. 2 is a schematic representation of a hand-held radiotelephone for audio and video communication.

FIG. 2 shows a hand-held radiotelephone HH2 which comprises, in addition to the components described in connection with the above embodiment, an LCD screen DIS and a CCD camera CAM.

The electroacoustic reproducing means, an earpiece R, is again spatially separated from the other components and includes an infrared receiver IRR of a wireless link between the housing of the hand-held radiotelephone HH2 and the earpiece R.

The housing of the hand-held radiotelephone includes an infrared transmitter IRT, which is connected to the AF output of the transceiver TC. The wireless link between the housing of the hand-held radiotelephone HH2 and the earpiece R gives the user great freedom of movement.

In this embodiment, too, full controllability of the hand-held radiotelephone is insured by the spatial separation. The distance from user to screen DIS and to camera CAM which is necessary in this embodiment would not be realizable with a hand-held radiotelephone of conventional design.

The earpiece R has an electromechanical plug P2, and the housing of the hand-held radiotelephone HH2 comprises a corresponding electromechanical socket P1, so that the earpiece R can be united with the housing of the radiotelephone. This permits both simple transport and hands-free operation of the hand-held radiotelephone HH2.

The antenna A of the hand-held radiotelephone HH2 is fully incorporated in the housing. The housing is designed to be held in the hand and set down on a supporting surface, e.g. a desk.

The hand-held radiotelephone shown in FIG. 2 could also be modified by spatially separating only the microphone M from the other components. This would be advantageous for videoconference applications, for example. In that case, stringent quality requirements are placed on voice pickup in order to permit, e.g., simultaneous intepreting by trained personnel or language computers.

The embodiments described relate particularly to a hand-held radiotelephone for mobile-radio networks, such as the GSM network, but the invention is not limited to these embodiments. In particular, a hand-held radiotelephone according to the invention is conceivable which is designed as a cordless telephone in a accordance with the CT1, CT2 or DECT standard (CT: Cordless Telephone; DECT: Digital European Cordless Telephone). Use outdoors as a so-called telepoint telephone is advantageous, since the hand-held radiotelephone is very compact during transport and operation. Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A hand-held radiotelephone having a two-part construction, comprising:

a housing means forming a first part of the two-part construction;

a transceiver (TC) arranged in the housing means for providing a radio communication link between the hand-held radiotelephone and a telecommunication system;

an antenna (A) connected to the transceiver (TC) for communicating radio communication signals having a high field strength that can be damaging to the health of a subscriber when a subscriber's head is closely held to the radiotelephone;

a keyboard control (KB) arranged in the housing means for establishing the radio communication link between the hand-held radiotelephone and the telecommunication system, and for retrieving stored data, including subscriber numbers, addresses or appointments by keyboard inquiry;

a display (Dis, DIS) arranged in the housing means for displaying alphanumeric characters, including keyboard inputs or incoming text;

an electroacoustic pickup means (M) for electroacoustically picking up a subscriber's voice to be heard by a calling or called party;

an electroacoustic reproduction means (R) for providing an electroacoustic reproduction of a calling or called party's voice to be heard by a subscriber;

only one of either the electroacoustic pickup means (M) or the electroacoustic reproduction means (R) being arranged in the housing means;

a remaining one of either the electroacoustic pickup means (M) or the electroacoustic reproduction means (R) that is not arranged in the housing means being spatially separated from the housing means to form a second part of the two-part construction;

whereby the subscriber can hold the radiotelephone away from the subscriber's head at a distance substantially greater than a couple of centimeters to reduce the undesirable effects on the health of the subscriber that can be caused by exposure of the subscriber's head to the high field strength of the radio communication signals;

whereby the subscriber has unrestricted visual and manual access to the keyboard control means (KB); and whereby the subscriber may easily view and read the display (Dis, DIS) when the subscriber is making a call on the hand-held radiotelephone.

2. A hand-held radiotelephone according to claim 1, wherein the electroacoustic pickup means (M) is a microphone (M) arranged in the housing means; and wherein the electroacoustic reproduction means (R) is a separate earpiece (R) forming the second part of the two-part construction and connected to the transceiver (TC) by wire using at least one separable connector.

3. A hand-held radiotelephone according to claim 1, wherein the electroacoustic reproduction means (R) is arranged in the housing means; and wherein the electroacoustic pickup means (M) is a separate microphone (M) forming the second part of the two-part construction connected to the transceiver (TC) by wire using at least one separable connector.

4. A hand-held radiotelephone according to claim 1, wherein the hand-held radiotelephone further comprises a camera (CAM) for recording video images of the subscriber to be provided to the calling or called party; and wherein the display (Dis, DIS) also has a video display (DIS) for displaying video images of the calling or called party.

5. A hand-held radiotelephone according to claim 1, wherein the electroacoustic pickup means (M) is a microphone (M) arranged in the housing means;

wherein the electroacoustic reproduction means (R) is a separate earpiece (R) forming the second part of the two-part construction and having an infrared receiver (IRR); and wherein the hand-held radiotelephone further comprises an infrared transmitter (IRT) for providing infrared communication signals to and from the infrared receiver (IRR) of the separate earpiece (R).

6. A hand-held radiotelephone according to claim 1, wherein the electroacoustic reproduction means (R) is arranged in the housing means;

wherein the electroacoustic pickup means (M) is a separate microphone (M) forming the second part of the two-part construction and having an infrared receiver (IRR); and wherein the hand-held radiotelephone further comprises an infrared transmitter (IRT) for providing infrared communication signals to and from the infrared receiver (IRR) of the separate microphone (M);

whereby the subscriber can speak directly into the microphone (M) in order to satisfy the stringent quality requirements placed on voice pickup to permit simultaneous interpreting by trained personnel or a language computer.

7. A hand-held radiotelephone according to claim 1, wherein the hand-held radiotelephone is a cordless telephone in accordance with a Cordless Telephone (CT) standard or a Digital European Cordless Telephone Standard (DECT).

8. A hand-held radiotelephone according to claim 1, wherein the radio communication link between the hand-held radiotelephone and the telecommunication system is a duplex link allowing two-way, simultaneous, communication between the subscriber and the calling or called party.

9. A hand-held radiotelephone having a two-part construction, comprising:

a housing means forming a first part of the two-part construction;

a transceiver (TC) arranged in the housing means for providing a radio communication link between the hand-held radiotelephone and a telecommunication system;

an antenna (A) connected to the transceiver (TC) for communicating radio communication signals having a high field strength that can be damaging to the health of a subscriber when a subscriber's head is closely held to the radiotelephone;

a keyboard control (KB) arranged in the housing means for establishing the radio communication link between the hand-held radiotelephone and the telecommunication system, and for retrieving stored data, including subscriber numbers, addresses or appointments by keyboard inquiry;

a display (Dis, DIS) arranged in the housing means for displaying alphanumeric characters, including keyboard inputs or incoming text as well as video images of the calling or called party;

a camera (CAM) for recording video images of the subscriber to be provided to the calling or called party;

an electroacoustic pickup means (M) for electroacoustically picking up a subscriber's voice to be heard by a calling or called party;

an electroacoustic reproduction means (R) for providing an electroacoustic reproduction of a calling or called party's voice to be heard by a subscriber;

only one of either the electroacoustic pickup means (M) or the electroacoustic reproduction means (R) being arranged in the housing means;

a remaining one of either the electroacoustic pickup means (M) or the electroacoustic reproduction means (R) that is not arranged in the housing means being spatially separated from the housing means to form a second part of the two-part construction;

whereby the subscriber can hold the radiotelephone away from the subscriber's head at a distance substantially greater than a couple of centimeters to reduce the undesirable effects on the health of the subscriber that can be caused by exposure of the subscriber's head to the high field strength of the radio communication signals;

whereby the subscriber has unrestricted visual and manual access to the keyboard control means (KB); and whereby the subscriber may easily view and read the display (Dis, DIS) when the subscriber is making a call on the hand-held radiotelephone.

10. A hand-held radiotelephone according to claim 9, wherein the electroacoustic pickup means (M) is a microphone (M) arranged in the housing means;

wherein the electroacoustic reproduction means (R) is a separate earpiece (R) forming the second part of the two-part construction and having an infrared receiver (IRR); and wherein the hand-held radiotelephone further comprises an infrared transmitter (IRT) for providing infrared communication signals to and from the infrared receiver (IRR) of the separate earpiece (R).

11. A hand-held radiotelephone according to claim 9, wherein the electroacoustic reproduction means (R) is arranged in the housing means;

wherein the electroacoustic pickup means (M) is a separate microphone (M) forming the second part of the two-part construction and having an infrared receiver (IRR); and wherein the hand-held radiotelephone further comprises an infrared transmitter (IRT) for providing infrared communication signals to and from the infrared receiver (IRR) of the separate microphone (M);

whereby the subscriber can speak directly into the microphone (M) in order to satisfy the stringent quality requirements placed on voice pickup to permit simultaneous interpreting by trained personnel or a language computer.

12. A hand-held radiotelephone according to claim 9, wherein the hand-held radiotelephone is a cordless telephone in accordance with a Cordless Telephone (CT) standard or a Digital European Cordless Telephone Standard (DECT).

13. A hand-held radiotelephone according to claim 9, wherein the radio communication link between the hand-held radiotelephone and the telecommunication system is a duplex link allowing two-way, simultaneous, communication between the subscriber and the calling or called party.

* * * * *

UNITED STATES PATENT AND TRADEMARK OFFICE
CERTIFICATE OF CORRECTION

PATENT NO.   : 5,966,643
DATED        : October 12, 1999
INVENTOR(S)  : Radley

It is certified that error appears in the above-identified patent and that said Letters Patent is hereby corrected as shown below:

Title page, item [56] under References Cited, Foreign Patent Documents, delete "2830096  11/1979 Germany" and insert --2820096  11/1979 Germany--.

Signed and Sealed this

Twenty-seventh Day of June, 2000

Attest:

Q. TODD DICKINSON

Attesting Officer

Director of Patents and Trademarks